United States Patent
Bazarsky et al.

(10) Patent No.: US 11,914,468 B1
(45) Date of Patent: Feb. 27, 2024

(54) NVME BOOT PARTITION ERROR CORRECTION CODE ENHANCEMENT

(71) Applicant: Western Digital Technologies, Inc., San Jose, CA (US)

(72) Inventors: Alexander Bazarsky, Holon (IL); Judah Gamliel Hahn, Ofra (IL); Shay Benisty, Beer Sheva (IL); Ariel Navon, Revava (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/887,687

(22) Filed: Aug. 15, 2022

(51) Int. Cl.
| | |
|---|---|
| *G06F 11/10* | (2006.01) |
| *G06F 9/00* | (2006.01) |
| *G06F 9/4401* | (2018.01) |
| *G06F 11/00* | (2006.01) |

(52) U.S. Cl.
CPC .......... *G06F 11/1048* (2013.01); *G06F 9/441* (2013.01)

(58) Field of Classification Search
CPC .. G06F 9/441; G06F 11/3037; G06F 11/3058; G06F 11/167; G06F 11/1048; G06F 11/183; G06F 12/0246; G06F 12/0864; G06F 11/3013; G06F 11/1004; G06F 11/187; G06F 2212/7201; G06F 2212/7207; Y02D 10/00
See application file for complete search history.

(56) References Cited

U.S. PATENT DOCUMENTS

| | | | |
|---|---|---|---|
| 9,612,979 B2 | 4/2017 | Chew | |
| 10,146,627 B2 | 12/2018 | Yu et al. | |
| 10,229,269 B1 | 3/2019 | Patton et al. | |
| 10,437,490 B2 * | 10/2019 | Suzuki | G06F 12/0875 |
| 10,725,792 B2 | 7/2020 | Sela et al. | |
| 10,901,862 B2 * | 1/2021 | Golov | G06F 11/3037 |
| 11,467,768 B2 * | 10/2022 | Lee | G06F 3/0644 |
| 11,487,439 B1 * | 11/2022 | Eemani | G06F 11/1666 |
| 2011/0029726 A1 | 2/2011 | Fujimoto | |
| 2012/0117367 A1 | 5/2012 | Lu et al. | |
| 2013/0232325 A1 | 9/2013 | Jang et al. | |
| 2020/0151067 A1 * | 5/2020 | Golov | G06F 11/183 |
| 2020/0210295 A1 | 7/2020 | Lee et al. | |
| 2021/0042448 A1 | 2/2021 | Jeon et al. | |
| 2021/0247921 A1 * | 8/2021 | Anderes | G06F 3/0604 |
| 2021/0326054 A1 * | 10/2021 | Jayaraman | G06F 3/0644 |
| 2021/0365207 A1 * | 11/2021 | Lee | G06F 3/0644 |
| 2023/0004649 A1 * | 1/2023 | Su | G06F 11/1417 |

(Continued)

*Primary Examiner* — Justin R Knapp
(74) *Attorney, Agent, or Firm* — PATTERSON + SHERIDAN, LLP; Steven H. VerSteeg (57) ABSTRACT

A data storage device includes a memory device and a controller coupled to the memory device. The controller is configured to compare a first copy of a boot partition to a second copy of the boot partition. The first copy of the boot partition and the second copy of the boot partition each comprises a same number of a plurality of boot chunks. The boot partition corresponds to data of a boot operation of a host device. The controller is further configured to mark one or more of the compared boot chunks that equals or exceeds a similarity threshold and update a reliability index based on the marking. Based on the marking and the reliability index, the controller may increase or decrease an amount of error correction needed for the boot data.

20 Claims, 6 Drawing Sheets

(56) References Cited

U.S. PATENT DOCUMENTS

2023/0112336 A1\* 4/2023 Dvori ................... G06F 9/4416
714/6.3
2023/0176577 A1\* 6/2023 Ditty ..................... G06V 20/58
701/23

\* cited by examiner

NVME BOOT PARTITION ERROR CORRECTION CODE ENHANCEMENT

BACKGROUND OF THE DISCLOSURE

Field of the Disclosure

Embodiments of the present disclosure generally relate to data storage devices, such as solid state drives (SSDs), storing boot partitions corresponding to a host device boot operation.

Description of the Related Art

Boot partitions are an optional area of a non-volatile memory (NVM) device of a data storage device that may be read by a host device without the host device initializing queues or enabling a controller of the data storage device. An NVM express (NVMe) controller that supports boot partitions stores two boot partitions of equal size using boot partition identifiers 0h and 1h. The two boot partitions allow the host device to update one and verify the contents before marking the boot partition active. The two boot partitions may also be used to store two different boot images or different versions of the same boot image. Typically, the two boot partition copies are similar to each other. Unlike in a boot operation of the data storage device, where copies of boot partitions may be used to improve error correction, the host device does not leverage the redundant nature of the boot partition copies of the host boot partitions. In other words, each copy of the host boot partitions is encoded and decoded by itself.

Therefore, there is a need in the art to leverage host boot partition copies to improve error correction capabilities of data provided directly to or fetched by a host device from a data storage device without initializing queues or enabling a controller of the data storage device.

SUMMARY OF THE DISCLOSURE

The present disclosure generally relates to data storage devices, such as solid state drives (SSDs), storing boot partitions corresponding to a host device boot operation. A data storage device includes a memory device and a controller coupled to the memory device. The controller is configured to compare a first copy of a boot partition to a second copy of the boot partition. The first copy of the boot partition and the second copy of the boot partition each comprises a same number of a plurality of boot chunks. The boot partition corresponds to data of a boot operation of a host device. The controller is further configured to mark one or more of the compared boot chunks that equals or exceeds a similarity threshold and update a reliability index based on the marking. Based on the marking and the reliability index, the controller may increase or decrease an amount of error correction needed for the boot data.

In one embodiment, a data storage device includes a memory device and a controller coupled to the memory device. The controller is configured to compare a first copy of a boot partition to a second copy of the boot partition, wherein the first copy of the boot partition and the second copy of the boot partition each comprises a plurality of boot chunks, wherein the plurality of boot chunks of the first copy of the boot partition and the plurality of boot chunks of the second copy of the boot partition are equal, wherein the first copy of the boot partition and the second copy of the boot partition are stored in the memory device, wherein the boot partition corresponds to data of a boot operation of a host device, mark one or more boot chunks of the plurality of boot chunks of the first copy of the boot partition and one or more boot chunks of the plurality of boot chunks of the second copy of the boot partition that equals or exceeds a similarity threshold based on the comparing, and update a reliability index based on the marking.

In another embodiment, a data storage device includes a memory device storing a first copy of a boot partition and a second copy of the boot partition, wherein the first copy and the second copy comprises a same number of boot chunks, wherein a first boot chunk of the second copy corresponds to data of a first boot chunk of the first copy, and wherein the boot partition corresponds to data associated with a boot operation of a host device, and a controller coupled to the memory device. The controller is configured to maintain a delta table, wherein the delta table tracks which boot chunk of the first copy matches a corresponding boot chunk of the second copy and which boot chunk of the first copy is different than a corresponding boot chunk of the second copy, determine that the boot operation is occurring, and utilize the first copy, the second copy, and the delta table in a decoding operation to provide the boot partition to the host device.

In another embodiment, a data storage device includes memory means storing a first copy of a boot partition and a second copy of the boot partition, wherein the first copy and the second copy comprises a same number of boot chunks, wherein a first boot chunk of the second copy corresponds to data of a first boot chunk of the first copy, and wherein the boot partition corresponds to data associated with a boot operation of a host device, and a controller coupled to the memory means. The controller is configured to compare a plurality of boot chunks of the first copy to a corresponding plurality of boot chunks of the second copy, wherein a result of the comparing is stored in a delta table, increase a correction capability associated with one or more boot chunks of the first copy corresponding to one or more boot chunks of the second copy that are different, and provide the boot partition to the host device, wherein providing the boot partition comprises using the first copy, the second copy, and the delta table to increase error correction capability during the boot operation.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), storing boot partitions corresponding to a host device boot operation. A data storage device includes a memory device and a controller coupled to the memory device. The controller is configured to compare a first copy of a boot partition to a second copy of the boot partition. The first copy of the boot partition and the second copy of the boot partition each comprises a same number of a plurality of boot chunks. The boot partition corresponds to data of a boot operation of a host device. The controller is further configured to mark one or more of the compared boot chunks that equals or exceeds a similarity threshold and update a reliability index based on the marking. Based on the marking and the reliability index, the controller may increase or decrease an amount of error correction needed for the boot data.

Figure 1:
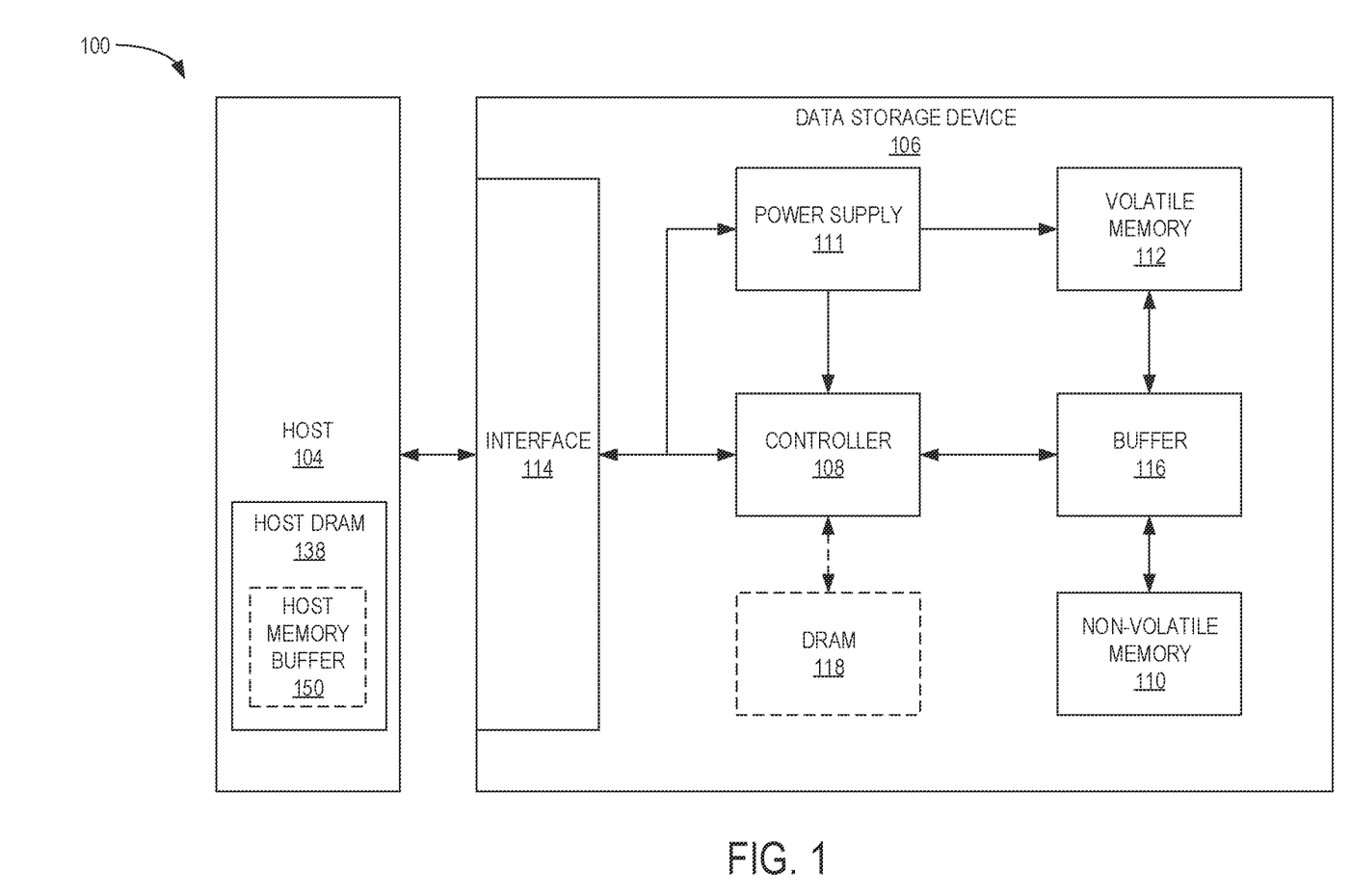
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
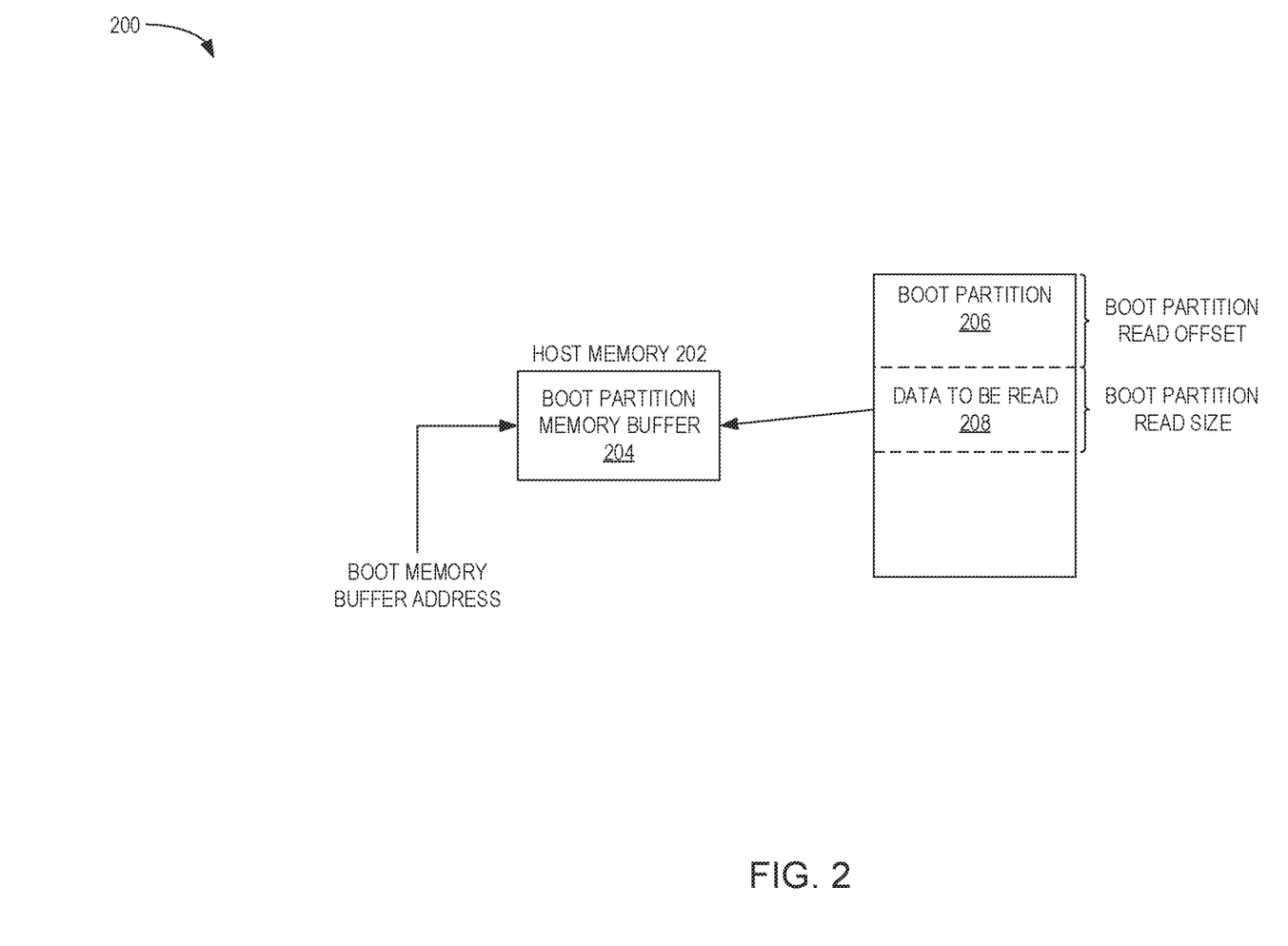
FIG. 2 is an exemplary illustration of a boot partition overview, according to certain embodiments.

FIG. 2 is an exemplary illustration of a boot partition overview 200, according to certain embodiments. A host device, such as the host device 104 of FIG. 1, allocates a portion of a host memory 202 as a boot partition memory buffer 204 to store a boot partition 206. The boot partition 206 may store data related to a boot operation of the host device 104. In order to read the contents of the boot partition 206 using an NVMe protocol, for example, the host device 104 allocates the boot partition memory buffer 204 in the host memory 202. It is to be understood that the previously mentioned protocol is not intended to be limiting, but to provide an example of a possible embodiment. The host device 104 initializes a base address of the boot partition 206 to point to the boot partition memory buffer 204. The host device 104 sets a boot partition identifier (ID), a boot partition read size, and a boot partition read offset to initiate a read operation (e.g., data to be read 208) of the boot partition 206. The host device 104 may continue reading from the boot partition 206 until the entire boot partition 206 has been read by polling and incrementing the relevant registers.

However, when the boot partition is stored in an NVM, such as the NVM 110 of FIG. 1, of a data storage device, such as the data storage device 106, the host device may read a portion of the boot partition 206 (e.g., data to be read 208) any time the NVM 110 subsystem is powered (i.e., may be read whether or not CC.EN is set to '1'). When a controller, such as the controller 108 of FIG. 1, supports boot partitions, the controller stores two boot partitions of equal size using boot partition IDs 0h and 1h in the NVM 110. Thus, when the host device 104 reads the boot partition from the NVM 110, the stored two boot partitions of equal size are provided to the host device 104.

Figure 3:
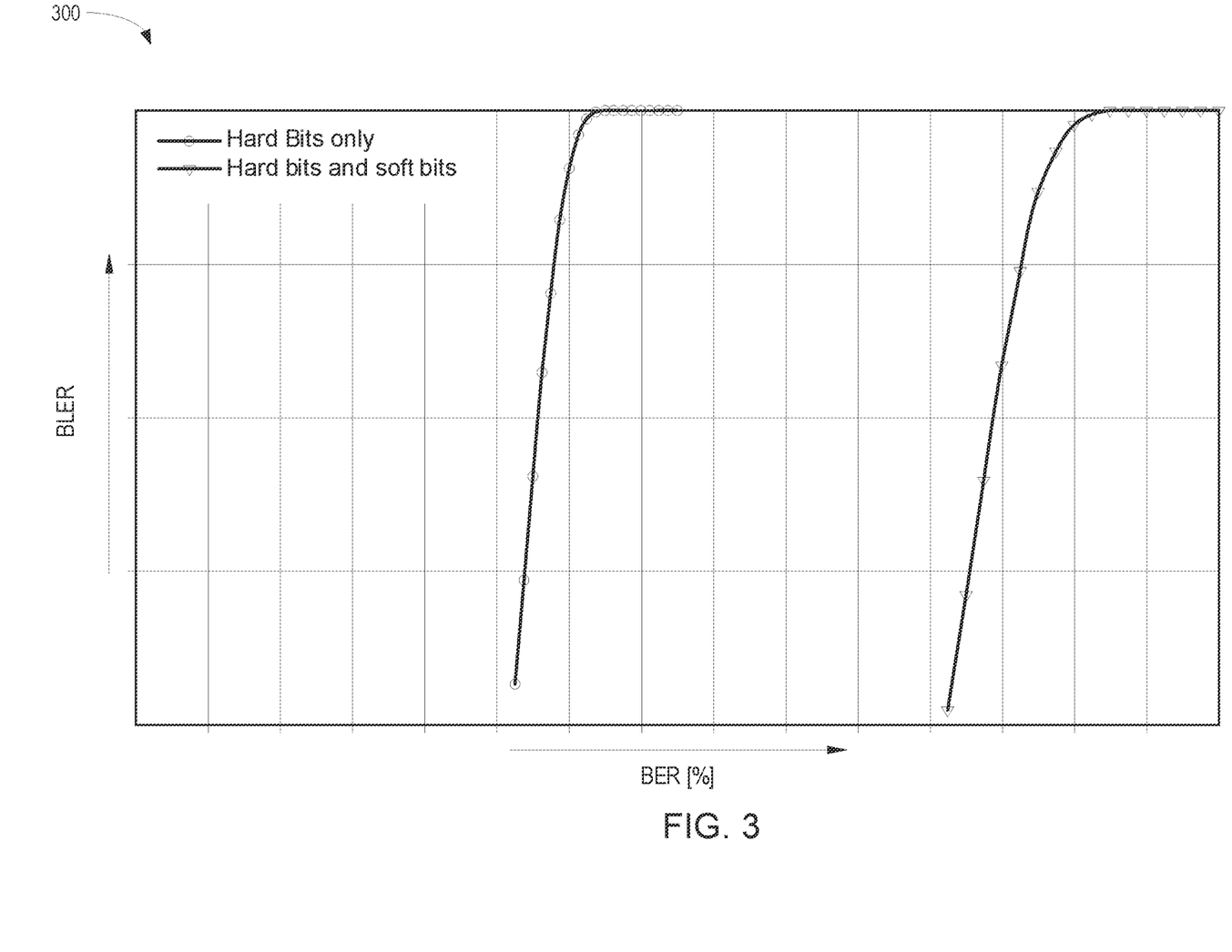
FIG. 3 is an exemplary illustration of a graph showing a correction capability comparison between using hard bits only and using both hard bits and soft bits, according to certain embodiments.

FIG. 3 is an exemplary illustration of a graph 300 showing a correction capability comparison between using hard bits only and using both hard bits and soft bits, according to certain embodiments. Data storage devices, such as the data storage device 106 of FIG. 1, utilize powerful error correcting codes (ECC) in order to comply with performance requirements. For example, low-density parity-check (LDPC) codes may be used due to a capacity-performance trade-off.

LDPC codes utilize soft bits in addition to using hard bits to correct errors in data having erroneous bits, which may have a better correction capability than just using hard bits to correct errors in the data having erroneous bits. Soft bits are generated by performing additional senses to the left (i.e., decreasing voltage direction) and to the right (i.e., increasing voltage direction) of a hard bit threshold. The additional senses may be at a predetermined difference from the hard bit threshold or be adjusted dynamically as part of a soft bit read threshold training method. The additional sense indicate whether each bit sensed or read is closer to the hard bit threshold (i.e., closer to a threshold voltage between cell states), which indicates a lower reliability that the bit will be read without errors, or further from the hard bit threshold (i.e., closer to a middle of a standard deviation of voltages for a certain cell state), which indicates a higher reliability that the bit will be read without errors. Referring to the graph 300 of FIG. 3, using soft bits with hard bits to decode data allows for higher correction capabilities than using only hard bits to decode data, as shown by the increased BER % for the hard bits only curve relative to the hard bit and soft bits curve.

Figure 4:
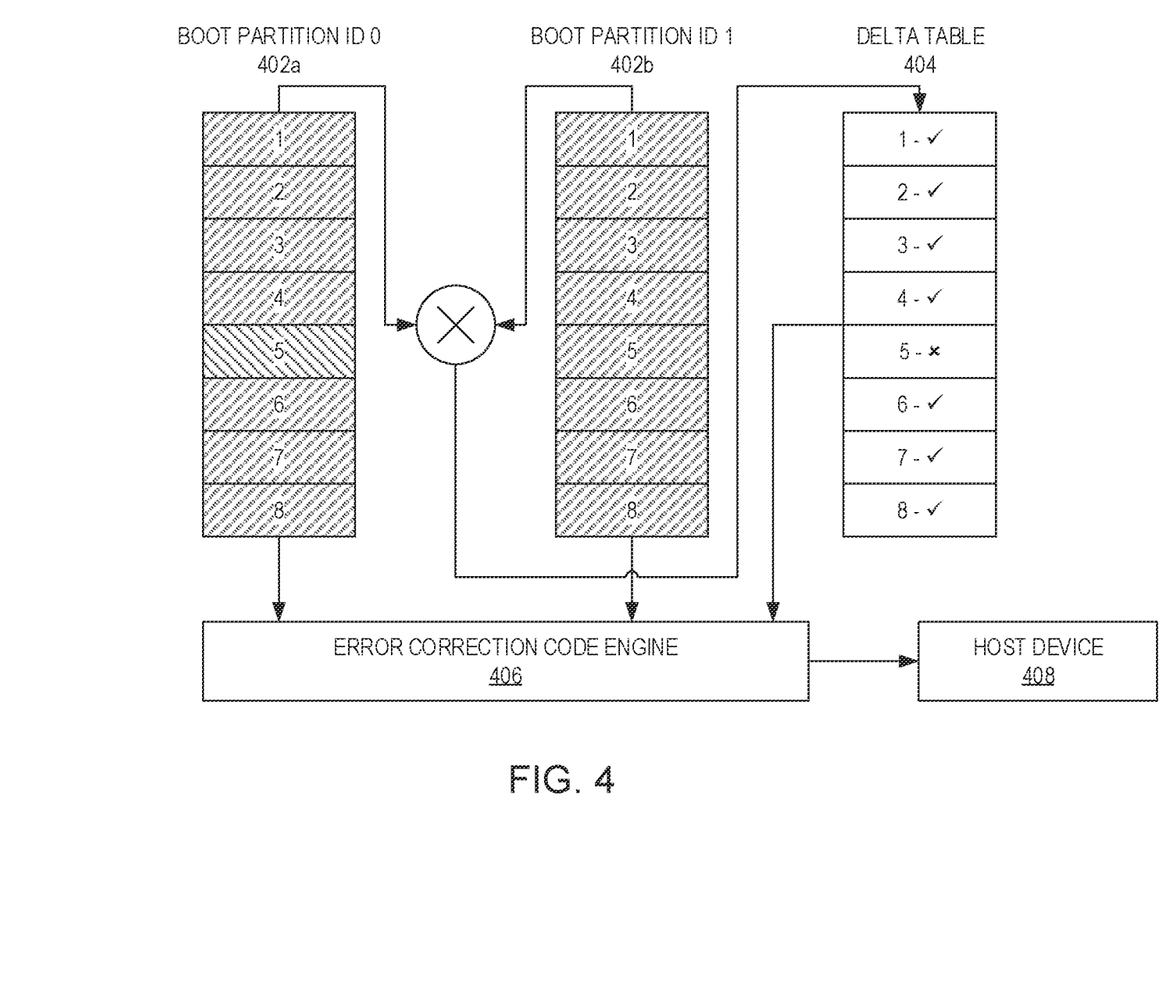
FIG. 4 is a schematic block diagram illustrating using copies of boot partitions to enhance error correction capabilities, according to certain embodiments.

FIG. 4 is a schematic block diagram illustrating using copies of boot partitions 402a, 402b to enhance error correction capabilities, according to certain embodiments. For exemplary purposes, aspects of the storage system 100 may be referenced herein. Boot partition ID 0 402a and boot partition ID 1 402b are the same or different versions of a boot partition corresponding to a host boot operation. The boot partition ID 0 402a and the boot partition ID 1 402b may be stored in the NVM 110. Likewise, the controller 108 may generate, maintain, and update a delta table 404 storing a comparison result between the boot partition ID 0 402a and the boot partition ID 1 402b. The delta table 404 may be stored in volatile memory, such as the optional DRAM 118, the volatile memory 112, an internal volatile memory of the controller 108, such as SRAM, or the like.

The boot partition ID 0 402a and the boot partition ID 1 402b each includes a plurality of boot chunks, where a number of the plurality of boot chunks of the boot partition ID 0 402a equals a number of the plurality of boot chunks of the boot partition ID 1 402b. In the current example, the boot partition ID 0 402a and the boot partition ID 1 402b each includes 8 boot chunks. It is to be understood that the number of boot chunks mentioned and shown in FIG. 4 is not intended to be limiting, but to provide an example of a possible embodiment. Likewise, in an exemplary embodiment, each boot chunk may be in a granularity of 4 KB. Furthermore, identical reference boot chunks of the boot partition ID 0 402a and the boot partition ID 1 402b refer to a same boot data of the boot partition. For example, if boot chunk 1 of boot partition ID 0 402a refers to data 0-10 of the boot partition, then boot chunk 1 of boot partition ID 1 402b refers to data 0-10 of the boot partition.

Corresponding boot chunks of the boot partition ID 0 402a and the boot partition ID 1 402b are provided to a comparison unit, which may be part of the controller 108 or logic of the controller 108, where the comparison unit determines if the corresponding boot chunks of the boot partition ID 0 402a and the boot partition ID 1 402b are different from each other (i.e., a different version) or the same as each other (i.e., a same version). Furthermore, the comparing may be based on a similarity threshold, such that the corresponding boot chunks of the boot partition ID 0 402a and the boot partition ID 1 402b may have a difference less than the similarity threshold and be considered the same. In other words, although the corresponding boot chunks of the boot partition ID 0 402a and the boot partition ID 1 402b do not match entirely, the corresponding boot chunks of the boot partition ID 0 402a and the boot partition ID 1 402b are within an expected range of differences.

The comparison unit outputs a result to the delta table 404, where the corresponding boot chunks of the boot partition ID 0 402a and the boot partition ID 1 402b that are marked as matching are stored in the delta table 404 and the corresponding boot chunks of the boot partition ID 0 402a and the boot partition ID 1 402b that are marked as different are stored in the delta table 404. The controller 108 may update a reliability index, which may be a log likelihood ratio (LLR), for each boot chunk that is indicated as having a matching same boot chunk. During a boot read operation, the boot partition ID 0 402a, the boot partition ID 1 402b, and the delta table 404 are provided to an error correction code (ECC) engine 406, where the ECC engine 406 decodes and corrects errors of the boot partition prior to providing the boot partition back to the host device 408. In other words, the boot partition ID 0 402a, the boot partition ID 1 402b, and the delta table 404 are used to enhance error correction capability of the ECC engine 406 when providing the boot partition to the host device 408. The comparing and marking of the corresponding boot chunks of the boot partition ID 0 402a and the boot partition ID 1 402b may be completed incrementally per boot chunk during a firmware download phase of a host boot operation.

The ECC engine 406 may use LDPC code to represent the reliability (i.e., reliability index) of read bits to the decoder of the controller 108. LLR tables provide the decoder initialization values for each codeword bit as a function of the read hard bit and soft bit values corresponding to codeword bit. The LLR sign indicates the bit estimate and the LLR magnitude indicates the reliability associated with this bit estimate. A larger LLR magnitude indicates that the bit estimate is more reliable and a lower magnitude indicates that the bit estimate is less reliable. For a 1 SB case, the LLR may be calculated as:

$$LLR_j = \log \frac{Pr(b_j = 0 | HB_j, SB_j)}{Pr(b_j = 1 | HB_j, SB_j)}$$

where the numerator indicates the probability that the bit is a 0 based on the hard bit (HB) values and the soft bit (SB) values, and where the denominator indicates the probability that the bit is a 1 based on the HB values and the SB values. In some examples, the boot chunk of the boot partition ID 1 402b may be used as soft bit data for the boot partition ID 0 402a when the corresponding boot chunks of the boot partition ID 0 402a and the boot partition ID 1 402b match.

When the delta table 404 indicates that the corresponding boot chunk of the boot partition ID 0 402a and the boot partition ID 1 402b are different (e.g., boot chunk 5), then the ECC engine 406 may utilize a standard reliability, which may correspond to a general or increased ECC operation applied to the boot chunks of the boot partition corresponding to the boot partition ID 0 402a and the boot partition ID 1 402b that are different. However, when the delta table 404 indicates that the corresponding boot chunk of the boot partition ID 0 402a and the boot partition ID 1 402b are the same (e.g., boot chunk 1), the value of the boot chunk (e.g., boot chunk 1) of the boot partition ID 0 402a is compared to the value of the boot chunk (e.g., boot chunk 1) of the boot partition ID 1 402b.

When the values are equal, then the LLR may be modified with increased reliability. However, when the values are not equal, then the LLR may be modified with decreased reliability. The optimized values of the LLR modifications (increased or decreased reliability due to copy matching) may either be generated by offline simulations or calibrated online through an LLR calibration mechanism, such as, in a non-limiting example, MisMatched Decoding (MMD). The LLR modification operation may be generalized to work with regular soft bits, such that LLRs have different values when the regular soft bits of each of the copies indicate a corresponding reliability. In some examples, a lower amount of error correction capability may be needed for matching chunks having a higher LLR than either matching chunks having a lower LLR or non-matching chunks. Likewise, a lower amount of error correction capability may be needed for matching chunks having a lower LLR than for non-matching chunks.

In some examples, the copies of the boot partition are stored in SLC memory. In other examples, selective placement of boot chunks of each copy of the boot partition may be stored in either the SLC memory or the TLC memory. For example, matching boot chunks may be stored in TLC memory, which may decrease an amount of ECC capability required, and non-matching boot chunks may be stored in SLC memory, which may increase the protection against errors and bit flips of the non-matching boot chunks. The reduced ECC capabilities caused by the TLC memory placement may be mitigated by the information exchange (i.e., reliability index/LLR) between the matching copies. In other examples, matching boot chunks may be stored in a blocks having a lower health (e.g., higher program/erase cycle count, higher bit error rate (BER) history, and the like) than other blocks. Although the matching boot chunks are stored in blocks having a lower health, the placement may be mitigated by the information exchange (i.e., reliability index/LLR) between the matching copies.

Figure 5A:
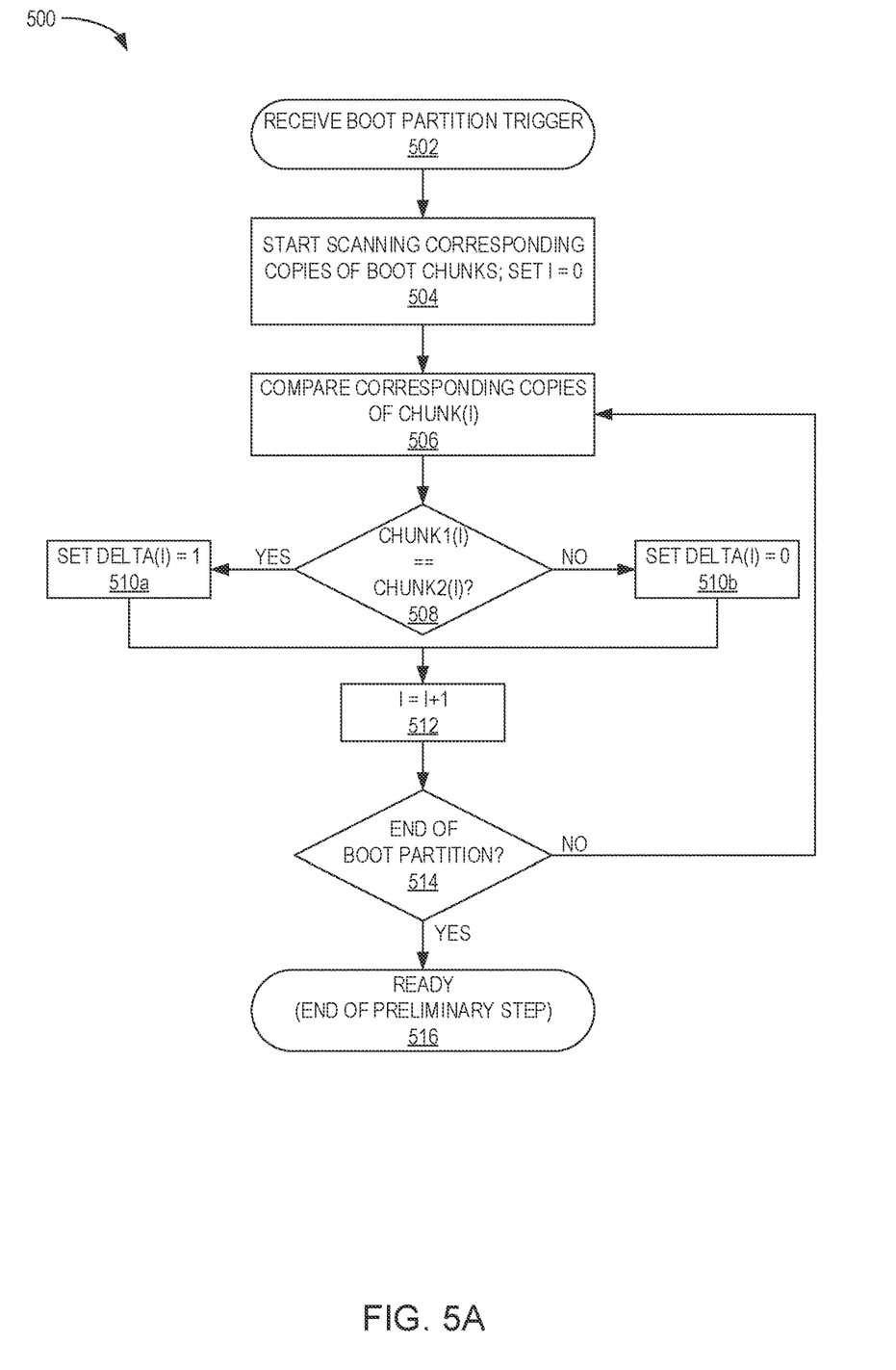
FIG. 5A is a flow diagram illustrating a method of determining whether a first boot chunk of a first copy of a boot partition matches a first boot chunk of a second copy of the boot chunk, according to certain embodiments.

FIG. 5A is a flow diagram illustrating a method 500 of determining whether a first boot chunk of a first copy of a boot partition matches a first boot chunk of a second copy of the boot chunk, according to certain embodiments. Aspects of FIG. 4 and the storage system 100 of FIG. 1 may be referenced herein for exemplary purposes. Method 500 may describe a preliminary step to improve error correction capacities of non-identical copies of the same data, such as host device boot partition data.

At block 502, the controller 108 receives a boot partition trigger from the host device 104. The boot partition trigger may be received during an NVMe firmware download phase (e.g., NVMe admin command 11h), a commit phase of the boot partition to the NVM 110 (e.g., NVMe admin command 10h), or after the commit phase of the boot partition to the NVM 110. For example, the boot partition trigger may be received when the host device 104 programs a new version of the boot partition to the NVM 110. At block 504, the controller 108 begins scanning corresponding copies of boot chunks (e.g., boot chunk 1 of boot partition ID 0 402a and boot chunk 1 of boot partition ID 1 402b) and sets I=0, where I represents the boot chunk number (e.g., boot chunk 1). The scanning may occur while the second copy (e.g., boot partition ID 1 402b) is written to the NVM 110 by the host device 104, where the controller 108, in parallel, fetches the boot chunks of the first copy (e.g., boot partition ID 0 402a) and the programmed boot chunks of the second copy and scans the corresponding copies of the boot chunks.

At block 506, the controller 108 compares the corresponding boot chunks scanned at block 504. At block 508, the controller 108 determines if a first boot chunk of a first boot partition matches a first boot chunk of a second boot partition. If the first boot chunk of the first boot partition matches the first boot chunk of the second boot partition at block 508, then the controller 108 marks the corresponding entry in the delta table 404 with a "1", which may correspond to a check mark, at block 510a. However, if the first boot chunk of the first boot partition does not match the first boot chunk of the second boot partition at block 508, then the controller 108 marks the corresponding entry in the delta table 404 with a "0", which may correspond to an x mark, at block 510b. At block 512, the controller 108 increments I by one. At block 514, the controller 108 determines if the end of the boot partition has been reached. For example, when the controller 108 increments I by one and the new value of I corresponds to a boot chunk that is non-existent, then the controller 108 may determine that the end of the boot partition has been reached. If the end of the boot partition has not been reached at block 514, then method 500 returns to block 506. However, if the end of the boot partition has been reached at block 514, then method 500 ends at block 516.

Figure 5B:
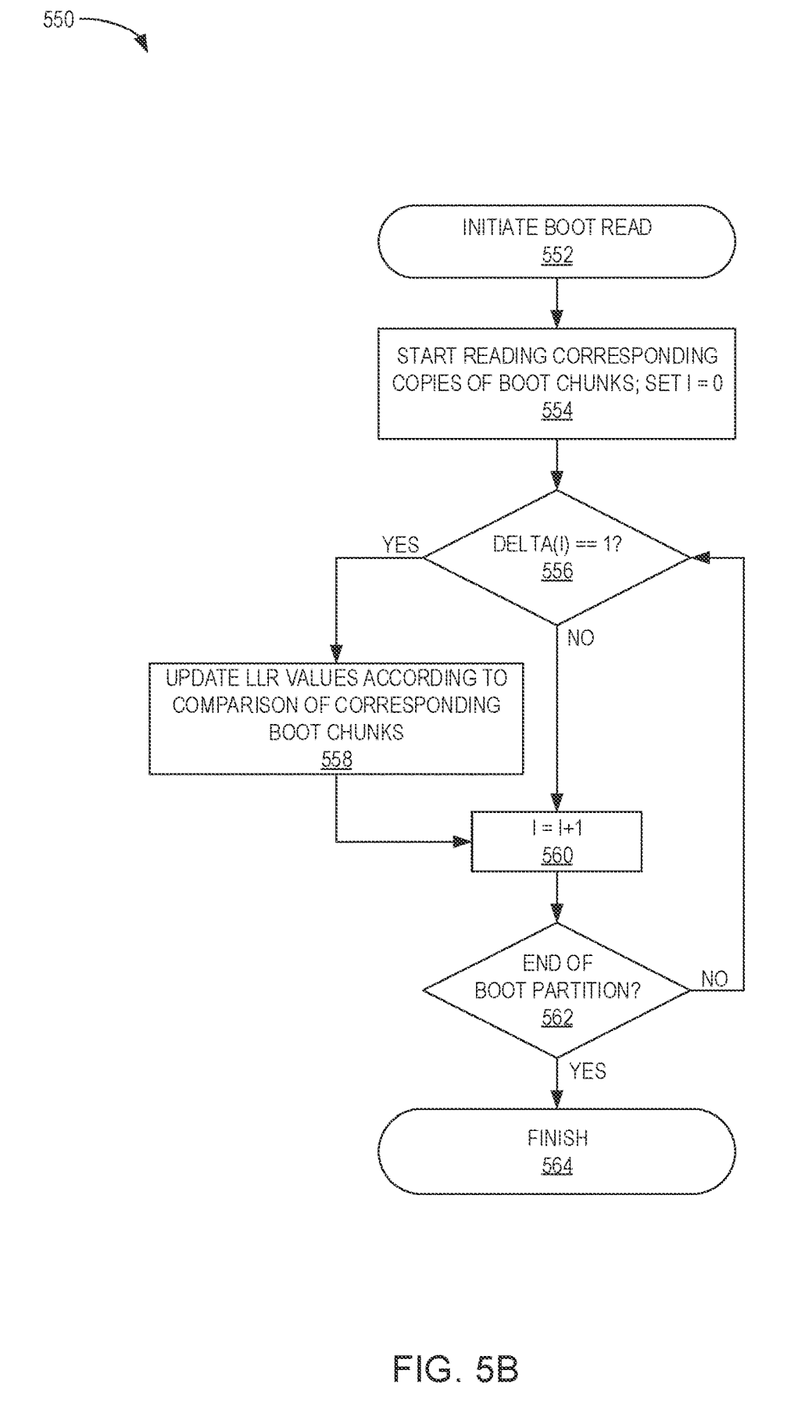
FIG. 5B is a flow diagram illustrating a method of utilizing the determination of the method of FIG. 5A to update a reliability index, according to certain embodiments.

FIG. 5B is a flow diagram illustrating a method 550 of utilizing the determination of the method 500 of FIG. 5A to update a reliability index, according to certain embodiments. Aspects of FIG. 4 and the storage system 100 of FIG. 1 may be referenced herein for exemplary purposes. Method 500 may be implemented by the controller 108 during a boot operation of the host device 104, where the host device 104 fetches the copies of the boot partitions (e.g., boot partition ID 0 402a and boot partition ID 1 402b) from the NVM 110.

At block 552, a boot read operation is initiated, where the boot read operation corresponds to reading a boot partition associated with a boot operation of the host device 104 from the NVM 110. At block 554, the controller 108 begins reading corresponding copies of boot chunks (e.g., boot chunk 1 of boot partition ID 0 402a and boot chunk 1 of boot partition ID 1402b) from the NVM 110 and sets I=0, where I represents the boot chunk number (e.g., boot chunk 1). At block 556, the controller 108 determines if the corresponding entry in the delta table 404 is equal to 1. If the corresponding entry is equal to 1 at block 556, then at block 558, the controller 108 updates the LLR values according to a comparison of corresponding boot chunks (e.g., updating a reliability index of the LLR). However, if the corresponding entry is not equal to 1(i.e., is equal to 0) at block 556 or after block 558, the controller 108 increments I by one at block 560.

At block 562, the controller 108 determines if the end of the boot partition has been reached. For example, when the controller 108 increments I by one and the new value of I corresponds to a boot chunk that is non-existent, then the controller 108 may determine that the end of the boot partition has been reached. If the end of the boot partition has not been reached at block 562, then method 550 returns to block 556. However, if the end of the boot partition has been reached at block 562, then method 550 ends at block 564. When boot partition ID 0 402a, boot partition ID 1 402b, and the delta table 404 are provided to the ECC engine 406, the ECC engine 406 may utilize the information regarding whether the corresponding boot chunks matches or does not match as well as the reliability index, which may enhance a correction capability of the ECC engine 406.

By leveraging boot partition copies associated with a boot operation of a host device, where the boot partition copies are stored in a data storage device, data reliability may be improved for the host device when the host device accesses the boot partition copies without initializing queues or enabling a controller of the data storage device.

In one embodiment, a data storage device includes a memory device and a controller coupled to the memory device. The controller is configured to compare a first copy of a boot partition to a second copy of the boot partition, wherein the first copy of the boot partition and the second copy of the boot partition each comprises a plurality of boot chunks, wherein the plurality of boot chunks of the first copy of the boot partition and the plurality of boot chunks of the second copy of the boot partition are equal, wherein the first copy of the boot partition and the second copy of the boot partition are stored in the memory device, wherein the boot partition corresponds to data of a boot operation of a host device, mark one or more boot chunks of the plurality of boot chunks of the first copy of the boot partition and one or more boot chunks of the plurality of boot chunks of the second copy of the boot partition that equals or exceeds a similarity threshold based on the comparing, and update a reliability index based on the marking.

A boot chunk of the plurality of boot chunks of the first copy of the boot partition is compared to a corresponding boot chunk of the plurality of boot chunks of the second copy of the boot partition. The reliability index is a log likelihood ratio (LLR). A magnitude of the LLR is increased when the boot chunk of the first copy of the boot partition matches to a corresponding boot chunk of the plurality of boot chunks of the second copy of the boot partition. A magnitude of the LLR is decreased when the boot chunk of the first copy of the boot partition is different than a corresponding boot chunk of the plurality of boot chunks of the second copy of the boot partition. The controller is further configured to iterate the comparing and the marking for each of the plurality of boot chunks of the first copy of the boot partition and the plurality of boot chunks of the second copy of the boot partition. The comparing is in response to a boot partition trigger corresponding to a firmware download phase of a host boot operation. The comparing and the marking occurs incrementally per boot chunk downloaded during the firmware download phase. The controller is further configured to fetch the first copy of the boot partition when the second copy of the boot partition is programmed to the memory device and perform the comparing in response to the fetching. The marked one or more boot chunks that are different are recorded in a delta table. The controller is further configured to utilize the first copy of a boot partition, the second copy of the boot partition, and the delta table during error correction code (ECC) decoding during the boot operation of the host device. The one or more boot chunks of the plurality of boot chunks of the first copy of the boot partition and the one or more boot chunks of the plurality of boot chunks of the second copy of the boot partition that are within the similarity threshold are stored in a first location of the memory device. The one or more boot chunks of the plurality of boot chunks of the first copy of the boot partition and the one or more boot chunks of the plurality of boot chunks of the second copy of the boot partition that equals or exceeds the similarity threshold are stored in a second location of the memory device. The second location is associated with greater error correction code (ECC) capabilities than the first location.

In another embodiment, a data storage device includes a memory device storing a first copy of a boot partition and a second copy of the boot partition, wherein the first copy and the second copy comprises a same number of boot chunks, wherein a first boot chunk of the second copy corresponds to data of a first boot chunk of the first copy, and wherein the boot partition corresponds to data associated with a boot operation of a host device, and a controller coupled to the memory device. The controller is configured to maintain a delta table, wherein the delta table tracks which boot chunk of the first copy matches a corresponding boot chunk of the second copy and which boot chunk of the first copy is different than a corresponding boot chunk of the second copy, determine that the boot operation is occurring, and utilize the first copy, the second copy, and the delta table in a decoding operation to provide the boot partition to the host device.

The delta table is stored in volatile memory. The delta table further includes a reliability index corresponding to each boot chunk of the first copy and the corresponding boot chunk of the second copy. The reliability index for boot chunks that are different corresponds to greater decoding needs than the reliability index for boot chunks that matches. The boot chunks of the first copy that matches corresponding boot chunks of the second copy are stored in triple level cell (TLC) memory and the boot chunks of the first copy that are different than the corresponding boot chunks of the second copy are stored in single level cell (SLC) memory.

In another embodiment, a data storage device includes memory means storing a first copy of a boot partition and a second copy of the boot partition, wherein the first copy and the second copy comprises a same number of boot chunks, wherein a first boot chunk of the second copy corresponds to data of a first boot chunk of the first copy, and wherein the boot partition corresponds to data associated with a boot operation of a host device, and a controller coupled to the memory means. The controller is configured to compare a plurality of boot chunks of the first copy to a corresponding plurality of boot chunks of the second copy, wherein a result of the comparing is stored in a delta table, increase a correction capability associated with one or more boot chunks of the first copy corresponding to one or more boot chunks of the second copy that are different, and provide the boot partition to the host device, wherein providing the boot partition comprises using the first copy, the second copy, and the delta table to increase error correction capability during the boot operation. The second copy is utilized as soft bit information for the first copy.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
a memory device; and
a controller coupled to the memory device, wherein the controller is configured to:
compare a first copy of a boot partition to a second copy of the boot partition, wherein:

the first copy of the boot partition and the second copy of the boot partition each comprises a plurality of boot chunks;

the plurality of boot chunks of the first copy of the boot partition and the plurality of boot chunks of the second copy of the boot partition are equal in number;

the first copy of the boot partition and the second copy of the boot partition are stored in the memory device; and the boot partition corresponds to data of a boot operation of a host device;

mark one or more boot chunks of the plurality of boot chunks of the first copy of the boot partition and one or more boot chunks of the plurality of boot chunks of the second copy of the boot partition that equals or exceeds a similarity threshold based on the comparing; and update a reliability index based on the marking.

2. The data storage device of claim 1, wherein a boot chunk of the plurality of boot chunks of the first copy of the boot partition is compared to a boot chunk of the plurality of boot chunks of the second copy of the boot partition.

3. The data storage device of claim 1, wherein the reliability index is a log likelihood ratio (LLR).

4. The data storage device of claim 3, wherein a magnitude of the LLR is increased when the boot chunk of the first copy of the boot partition matches to a boot chunk of the plurality of boot chunks of the second copy of the boot partition.

5. The data storage device of claim 3, wherein a magnitude of the LLR is decreased when the boot chunk of the first copy of the boot partition is different than a boot chunk of the plurality of boot chunks of the second copy of the boot partition.

6. The data storage device of claim 1, wherein the controller is further configured to iterate the comparing and the marking for each of the plurality of boot chunks of the first copy of the boot partition and the plurality of boot chunks of the second copy of the boot partition.

7. The data storage device of claim 1, wherein the comparing is in response to a boot partition trigger corresponding to a firmware download phase of a host boot operation.

8. The data storage device of claim 7, wherein the comparing and the marking occurs incrementally per boot chunk downloaded during the firmware download phase.

9. The data storage device of claim 1, wherein the controller is further configured to:
fetch the first copy of the boot partition when the second copy of the boot partition is programmed to the memory device; and
perform the comparing in response to the fetching.

10. The data storage device of claim 1, wherein the marked one or more boot chunks that are different are recorded in a delta table.

11. The data storage device of claim 10, wherein the controller is further configured to utilize the first copy of a boot partition, the second copy of the boot partition, and the delta table during error correction code (ECC) decoding during the boot operation of the host device.

12. The data storage device of claim 1, wherein:
the one or more boot chunks of the plurality of boot chunks of the first copy of the boot partition and the one or more boot chunks of the plurality of boot chunks of the second copy of the boot partition that are within the similarity threshold are stored in a first location of the memory device; and
the one or more boot chunks of the plurality of boot chunks of the first copy of the boot partition and the one or more boot chunks of the plurality of boot chunks of the second copy of the boot partition that equals or exceeds the similarity threshold are stored in a second location of the memory device.

13. The data storage device of claim 12, wherein the second location is associated with greater error correction code (ECC) capabilities than the first location.

14. A data storage device, comprising:
a memory device storing a first copy of a boot partition and a second copy of the boot partition, wherein the first copy and the second copy comprises a same number of boot chunks, wherein a first boot chunk of the second copy corresponds to first data of a first boot chunk of the first copy, and wherein the boot partition corresponds to second data associated with a boot operation of a host device; and
a controller coupled to the memory device, wherein the controller is configured to:
maintain a delta table, wherein the delta table tracks which boot chunk of the first copy matches a corresponding boot chunk of the second copy and which boot chunk of the first copy is different than a corresponding boot chunk of the second copy;
determine that the boot operation is occurring; and
utilize the first copy, the second copy, and the delta table in a decoding operation to provide the boot partition to the host device.

15. The data storage device of claim 14, wherein the delta table is stored in volatile memory.

16. The data storage device of claim 14, wherein the delta table further includes a reliability index corresponding to each boot chunk of the first copy and the corresponding boot chunk of the second copy.

17. The data storage device of claim 16, wherein the reliability index for boot chunks that are different corresponds to greater decoding needs than the reliability index for boot chunks that matches.

18. The data storage device of claim 14, wherein the boot chunks of the first copy that matches corresponding boot chunks of the second copy are stored in triple level cell (TLC) memory and the boot chunks of the first copy that are different than the corresponding boot chunks of the second copy are stored in single level cell (SLC) memory.

19. A data storage device, comprising:
memory means storing a first copy of a boot partition and a second copy of the boot partition, wherein the first copy and the second copy comprises a same number of boot chunks, wherein a first boot chunk of the second copy corresponds to first data of a first boot chunk of the first copy, and wherein the boot partition corresponds to second data associated with a boot operation of a host device; and
a controller coupled to the memory means, wherein the controller is configured to:
compare a plurality of boot chunks of the first copy to a corresponding plurality of boot chunks of the second copy, wherein a result of the comparing is stored in a delta table;
increase a correction capability associated with one or more boot chunks of the first copy corresponding to one or more boot chunks of the second copy that are different; and provide the boot partition to the host device, wherein providing the boot partition comprises using the first copy, the second copy, and the delta table to increase error correction capability during the boot operation.

20. The data storage device of claim 19, wherein the second copy is utilized as soft bit information for the first copy.

* * * * *